July 4, 1961 P. F. DAROIS 2,991,459

DIGITAL STORAGE OSCILLOGRAPH

Filed Sept. 1, 1955 5 Sheets-Sheet 1

INVENTOR.
P. F. DAROIS

BY

*H F Presson*

ATTORNEY

INVENTOR.
P. F. DAROIS
BY
[signature]
ATTORNEY

July 4, 1961 P. F. DAROIS 2,991,459

DIGITAL STORAGE OSCILLOGRAPH

Filed Sept. 1, 1955 5 Sheets-Sheet 3

INVENTOR.
P. F. DAROIS

BY

[signature]

ATTORNEY

INVENTOR.
P. F. DAROIS

BY

ATTORNEY

July 4, 1961 P. F. DAROIS 2,991,459

DIGITAL STORAGE OSCILLOGRAPH

Filed Sept. 1, 1955 5 Sheets-Sheet 5

INVENTOR.
P. F. DAROIS

BY

[signature]

ATTORNEY

2,991,459
DIGITAL STORAGE OSCILLOGRAPH

Paul F. Darois, Stamford, Conn., assignor to The Teleregister Corporation, Stamford, Conn., a corporation of Delaware Filed Sept. 1, 1955, Ser. No. 531,889
5 Claims. (Cl. 340—324)

The present invention relates generally to character display storage systems and more particularly to a system for digital representation of a varying function.

This invention has general utility in any field where a varying function is measured and where it is desirable to visually observe the fluctuations and variations of the measured function. Such a function may, for example, be employed to indicate antennae radiation patterns, temperatures, pressures, voltage changes, or other varying characteristics which may be represented by voltages which vary proportionally to the effects being measured. Heretofore meters and oscillographs have been employed to register these variations for visual observation. However, indications from such instruments are generally transitory and subject to inaccuracies. The system here to be described receives the varying function and converts it into digital equivalents that may be stored on the screen of a character-forming cathode ray tube. An example of such a tube which is well known and commercially available is the Typotron manufactured by Hughes Aircraft Co. For a detailed description of this type of tube reference may be had to the publication of the Research and Development Laboratories of Hughes Aircraft Co., Culver City, California, U.S.A., dated April 5, 1954, and entitled "The Typotron," or U.S. Patent 2,728,872.

In practicing the present invention, the function to be observed is first converted into a voltage that varies in amplitude as the function. This voltage is applied to the selector element of a character-forming cathode ray tube. Then by energizing the tube, a digit will appear on the tube screen as determined by the potential on the selector element at the time of energization. By periodically energizing the tube a series of digits will be displayed which represent the amplitude of the varying potential on the selector element which in turn varies as the input function. In this manner the function is sampled at equal time increments and a point by point plot is displayed on the face of the cathode ray tube.

A pulse generator is provided to control the energization of the cathode ray tube to insure regular and periodic operation thereof. When the tube face is filled, the digits thereon may be erased so that further sampling of the function may continue, or further sampling of the function may be discontinued and the stored digits may be retained.

If the function is cyclic, the wave form display may be superimposed over the digital display so that both may be conveniently observed. Also, a multiplexing arrangement provides for a digital display of a plurality of functions by means of a time sharing arrangement as will be described hereinafter.

It is therefore a primary object of the present invention to provide a digital storage oscillograph.

Another object of this invention is to provide a novel control circuit for a cathode ray storage tube.

Another object of this invention is to provide a means whereby digital representation of a function may be visually observed.

A further object of this invention is to provide a digital display representing a periodic sampling of a varying function.

A further object of this invention is to provide a system wherein a varying function is periodically sampled, and the sampling points are digitally represented on the screen of a cathode ray tube to be visually observed.

A further object of this invention is to provide a system for digitally representing a varying function and wherein the wave form thereof may be simultaneously represented on a time sharing basis.

A still further object of this invention is to provide a system wherein a plurality of varying functions may be digitally represented.

Another object of the present invention is to provide a system wherein the digital representation of a varying function may be subdivided into decimal components for more accurate representation.

These and other objects of the present invention will become apparent from the following description taken with the drawings in which.

Figures 1, 4, 12:
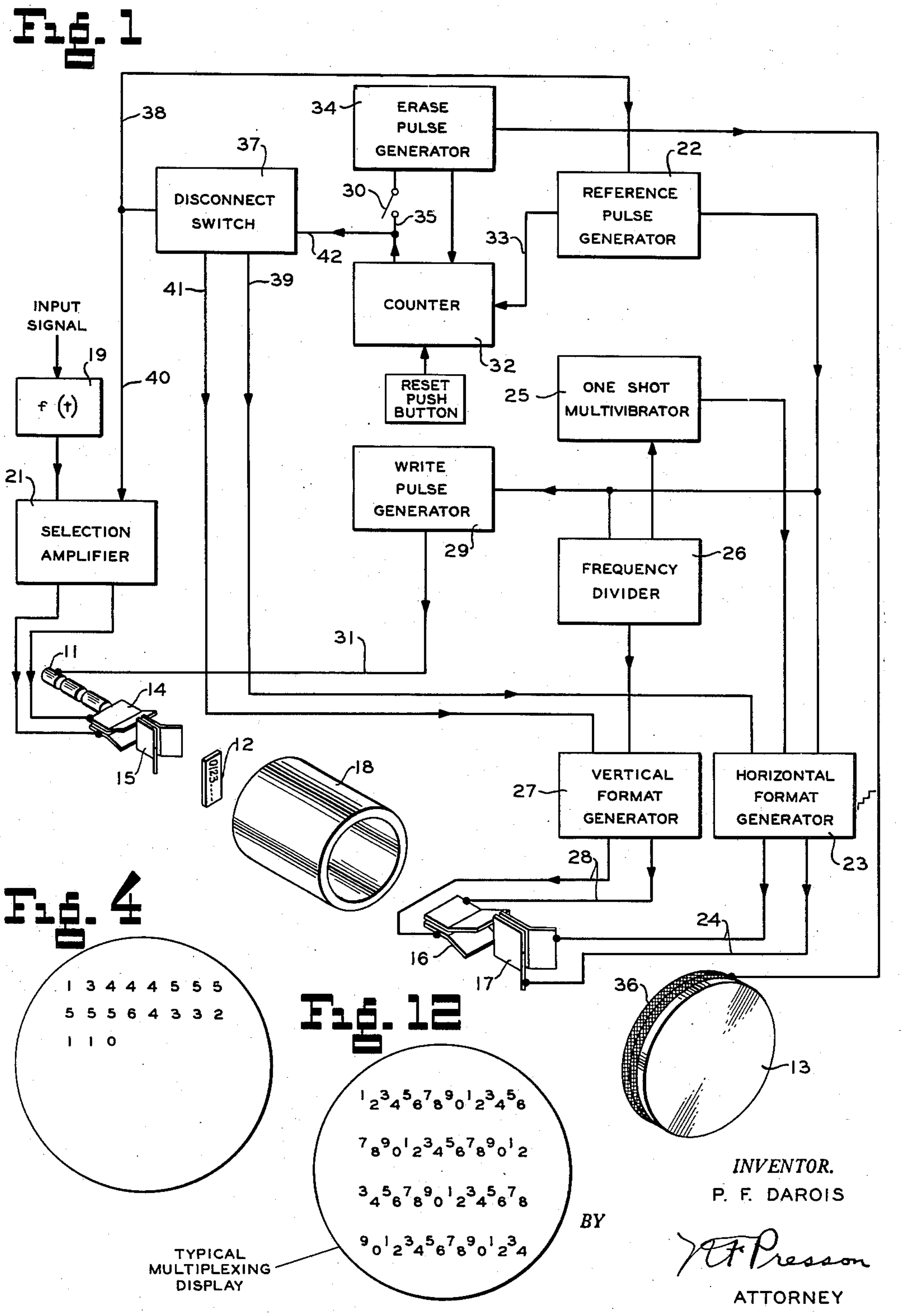
FIG. 1 shows a perspective view of a character-forming cathode ray tube with the circuit elements of the control system shown in block form.
Figure 2:
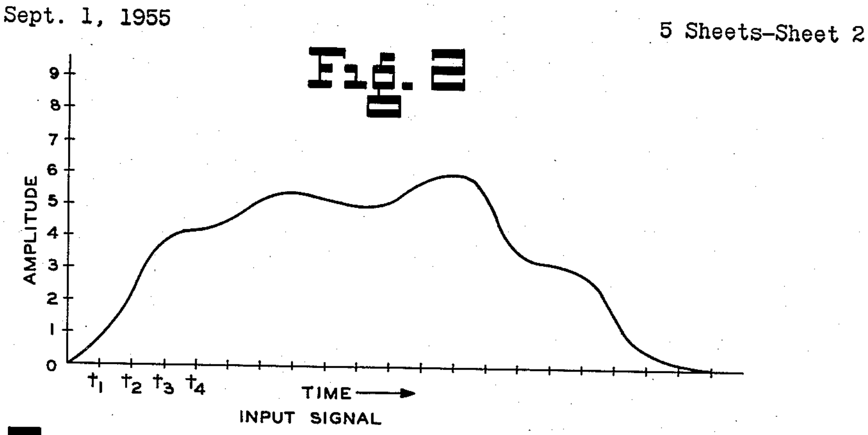
FIG. 2 shows by way of example a wave form of a function that varies with time and that may be sampled for visual digital representation.
Figure 3A:
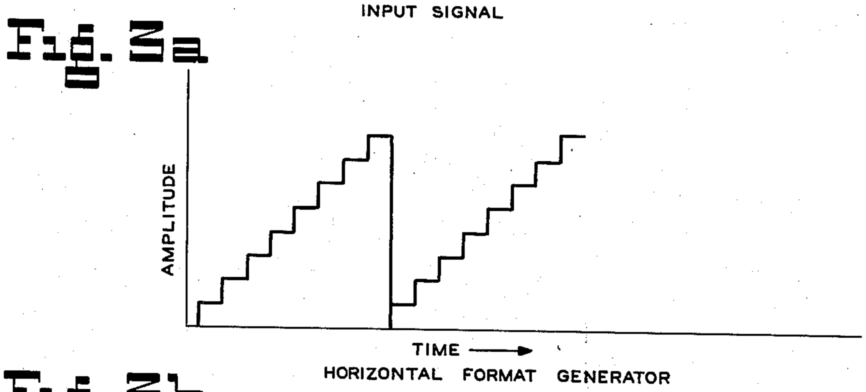
Figure 3B:
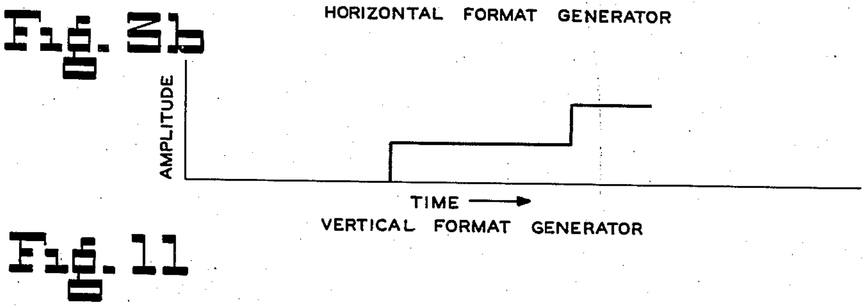
Figure 6:
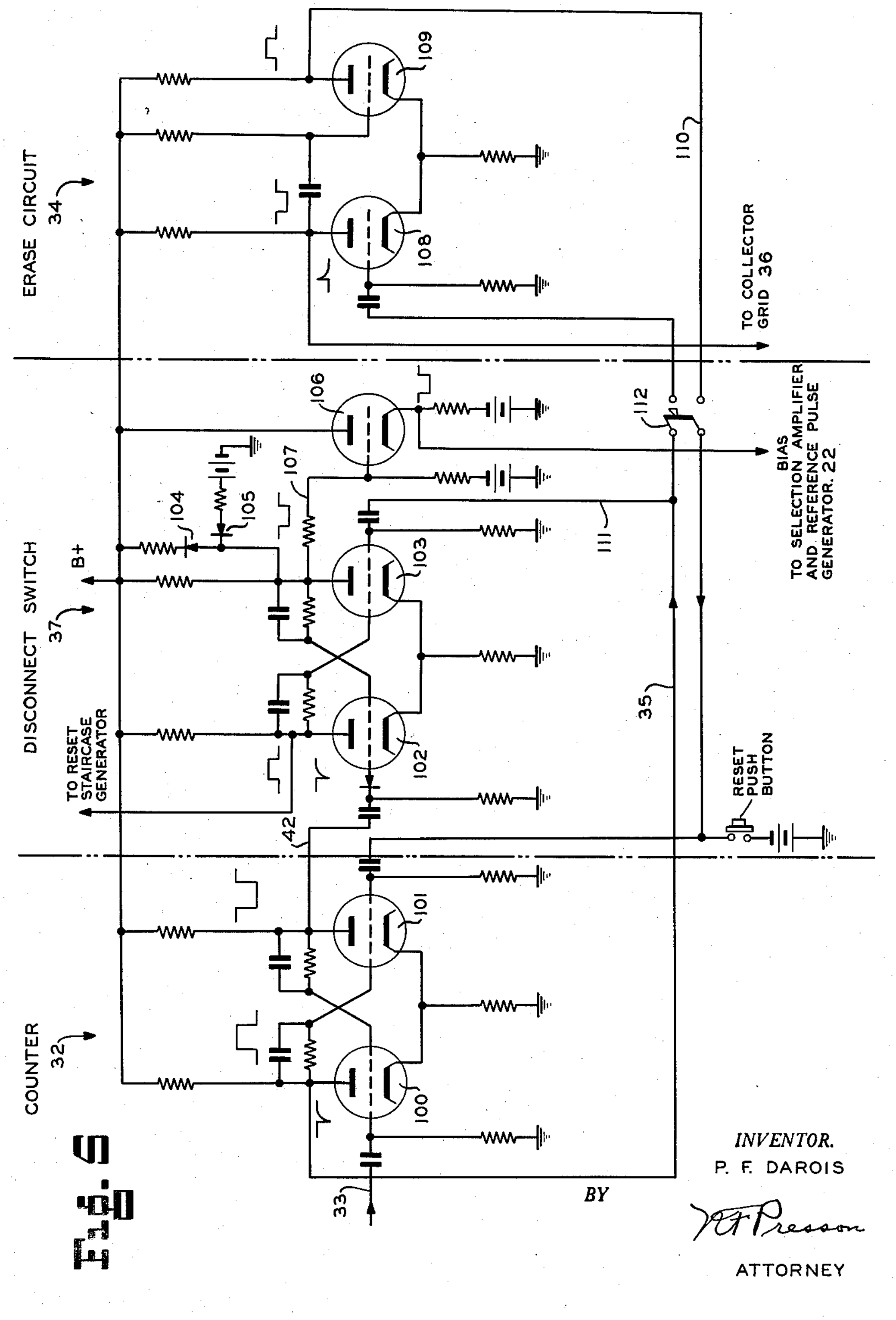
Figures 6, 7:
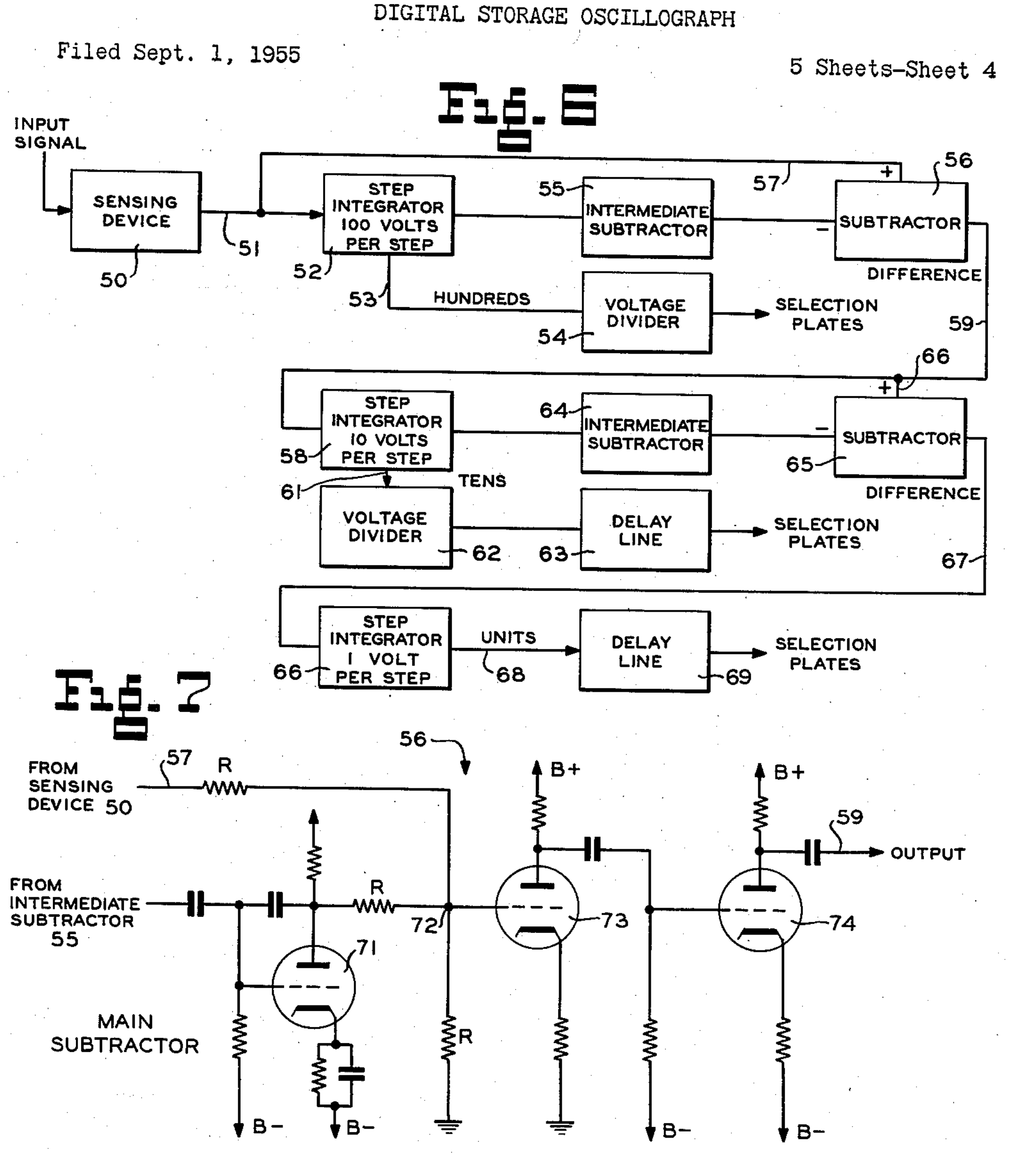
Figure 8:
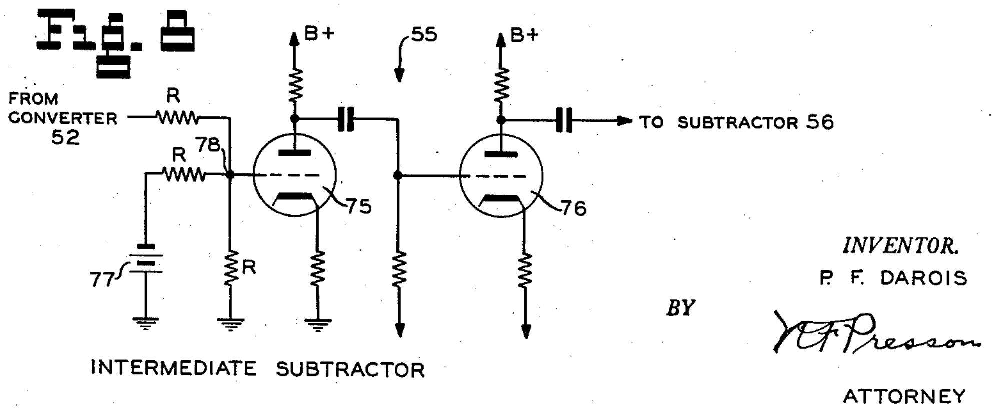
Figures 9, 10:
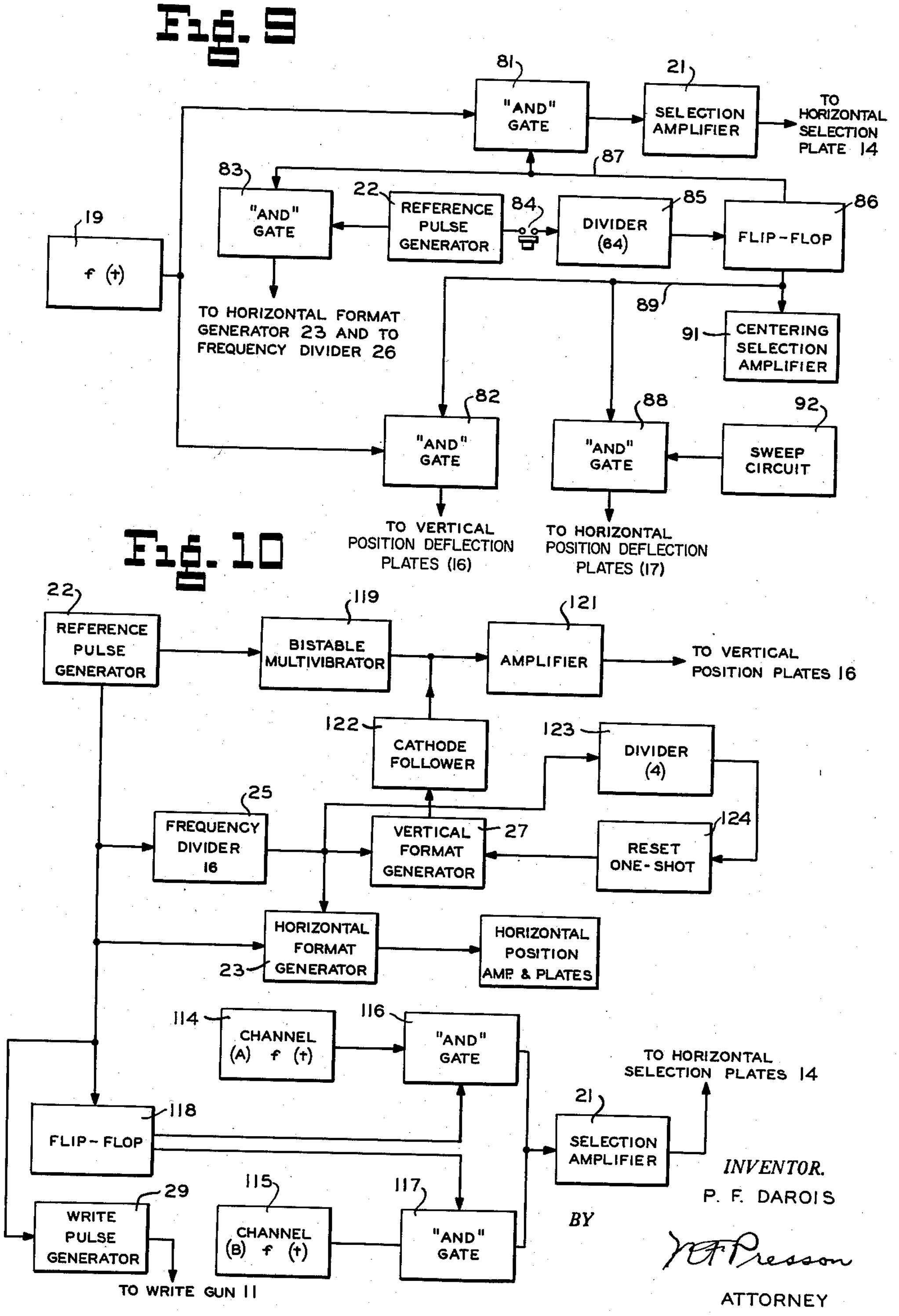

FIGS. 3*a* and 3*b* show the staircase wave forms that are applied to the horizontal and vertical position plates of the character-forming cathode ray tube in order to position the digits in rows and columns on the screen of the tube;

FIG. 4 shows by way of example the digital representation on the tube screen of the wave form of FIG. 2;

FIG. 5 is a schematic wiring diagram of the reset circuits shown in block form in FIG. 1;

FIG. 6 is a block diagram of a modification of the system of FIG. 1 in which the input signal is broken up into its decimal components which are visually represented on the viewing screen;

FIG. 7 is a schematic diagram of the main subtractor circuit of FIG. 6;

FIG. 8 is a schematic diagram of the intermediate subtractor circuit of FIG. 6;

FIG. 9 is a block diagram of a further modification of the system of FIG. 1 in which both the digital and wave form representation of a function may be simultaneously displayed;

FIG. 10 is a block diagram of another modification of the system of FIG. 1 in which a plurality of varying functions are digitally represented;

FIGS. 11*a*, 11*b* and 11*c* show the wave forms that are applied to the vertical position plates of the cathode ray tube of the system of FIG. 10; and FIG. 12 shows the digital representation on the tube screen of the system shown in FIG. 10.

Before considering the control circuit of the present invention the character-forming cathode ray tube will be briefly described. This type of tube is diagrammatically represented in FIG. 1 and includes a glass envelope in which the elements are enclosed. A source of electrons is obtained from a write gun 11 located at the end of the neck of the tube. When a proper potential is applied to the write gun grid, a stream of electrons is emitted which will impinge on the face of the tube in a similar manner as the conventional cathode ray tube. By providing sufficient negative bias on the write gun grid, the electron beam can be cut off so that its presence can be selectively controlled. A matrix 12 located in the path of the electron beam determines the character that is formed on the screen 13. The matrix acts as a stencil in that it forms the electron beam into selected characters as the beam passes therethrough. While the matrix may be of any convenient shape and contain both alphabetical and numerical characters, it is shown here as a rectangle having consecutive numbers from 0 to 9. Thus the electron beam will be formed into one of these digits depending upon the point at which it passes through the matrix. It is seen therefore that by selectively deflecting the electron beam, any desired digit may be made to appear on the screen 13. This selective deflection of the beam is accomplished by a pair of horizontal deflection plates 14 interposed between the write gun and matrix. Since the matrix as herein shown has only one line of characters, complete selection is obtained by the horizontal selection plates alone. If a matrix having a plurality of rows of characters is used, the vertical selection plates 15 are used with the horizontal selection plates to obtain complete selection. However, with the matrix shown in FIG. 1, it is only necessary to consider the horizontal selection plates 14. It is seen therefore that by applying predetermined potentials to the horizontal selection plates the desired characters will be formed and appear on the screen 13.

In order to prevent divergence of the electron beam and insure that it passes between position deflection plates 16 and 17, a convergence coil 18 is provided. In addition to causing the beam to converge, the action of the coil 18 also results in a 90° rotation of the beam. It is because of this right angle rotation that the matrix 12 is vertically disposed and the horizontal deflection plates 14 are horizontally positioned. The position deflection plates 16 and 17 serve to position the selected character in its proper location on the screen. In order to sequentially locate the characters in columns and rows on the screen, a staircase wave form of voltage is applied to each pair of deflection plates 16 and 17. These signals applied to the position deflection plates will be termed the format signals and will be considered in detail hereinafter.

Referring now to FIG. 2, there is shown for example a wave form that varies as a function of time. A digital representation of this function may be obtained by periodically sampling the function at equal intervals of time such as $t_1$, $t_2$, $t_3$, etc. The ordinate at each of these points represents the amplitude or magnitude of the function and by means of the present invention is made to appear in digital form on the face of the character-forming cathode ray tube. The signal to be stored, such as that shown in FIG. 2, is fed to a sensing device 19 (FIG. 1). This device may be an analogue circuit of any known construction and serves to yield a voltage output proportional to the magnitude of the input signal. The output of the analogue device 19 is passed to a selection amplifier 21 which raises the signal to the proper level depending upon the characteristics of the cathode ray tube. The amplified signal is then fed to the horizontal selection plates 14. With a continuously varying input signal it is seen that the selection potential as it appears on the horizontal selection plates will be continuously changing and will accordingly control the position of the electron beam passing therebetween.

This varying signal is periodically sampled by triggering the electron beam at periodic intervals. A reference pulse generator 22 is provided which may be of conventional construction and adjusted to produce 16 pulses, for example, in a given period of time. These pulses are passed to the horizontal format generator 23 which may be of the Anodige Integrator Type shown in the U.S. National Bureau of Standards Report 1117, or U.S. Patent 2,761,968. The reference pulses function to trigger the horizontal format generator 23 which in turn applies a staircase wave form to the horizontal position deflection plates 17 over lines 24. This staircase signal has eight steps as shown in FIG. 3*a*, and results in the electron beam stepping horizontally eight times to position eight selected digits in a straight line across the face of the tube allowing proper spacing between successive digits. At the end of the eight steps the output of the horizontal format generator drops down to the initial position as shown in FIG. 3*a*. At this point a vertical format generator with an output signal as seen in FIG. 3*b* steps to position the succeeding eight digits on the second line across the face of the tube. The reference pulses from the pulse generator 22 are fed to a frequency divider 26 which divides the received frequency to control the vertical format generator 27. In this manner one pulse is supplied to trigger the vertical format generator for every eight pulses passed to the horizontal format generator 23. The vertical generator 27 may be of the same type as the horizontal generator and adjusted to step once for each received triggering pulse. The output of the vertical format generator 27 is fed by lines 28 to the vertical position deflection plates 16. It is seen therefore that the potential on the horizontal position deflection plates 17 is stepped eight times while the potential on the vertical position deflection plates remains constant. At this point, a line of eight digits is displayed, as will be described hereinafter, and the potential on the vertical position deflection plates is stepped as shown in FIG. 3. The output from frequency divider 26 is also passed to a one-shot multivibrator 25 which serves to reset the horizontal format generator at the end of each line of digits.

The output of reference pulse generator 22 is also fed to a write pulse generator 29 which is triggered once for each received pulse. The write pulse generator furnishes pulses of proper amplitude which are passed over line 31 to the write gun 11 of the cathode ray tube. Each such pulse causes the write gun to emit a stream of electrons of a duration equal to that of each write pulse. The electron beam will pass through the matrix 12 at a point determined by the potential on the horizontal selection plates 14 at the time that the write pulse initiates the electron beam. Thus the electron beam will be formed into a digit depending upon the amplitude of the input signal. By the operation of the horizontal and vertical format generators, successive electron beams will cause their respective digits to appear on screen 13 in rows from left to right starting at the top of the screen. For example, the wave form of FIG. 2 will appear on the screen as seen in FIG. 4.

The pulses from the reference pulse generator 22 are also fed to an electronic counter 32 over line 33. The counter may be of any conventional construction and serves to count the write pulses applied to the write gun. When the counter receives a number of pulses equal to the number of digits to fill the face of the cathode ray tube, a stop pulse is generated. With eight digits per line and eight lines on the tube screen, the counter will generate a stop pulse after 64 write pulses. The stop pulse is fed to an erase pulse generator 34 over line 35 and switch 30 which generates an erase pulse of proper negative potential which is applied to the storage grid 36 of the cathode ray tube. In this manner the digits on the screen are erased and the tube is then ready to receive further digital representation.

The stop pulse generated by counter 32 is also fed to a disconnect switch 37 over line 42 which turns off the system by disconnecting the reference pulse generator 22 over line 38, the selector amplifier 21 over line 40, and the horizontal and vertical format generators over lines 39 and 41, respectively. It is seen therefore that when the face of the tube is filled, the system is immediately shut down to prevent further digits from being superimposed over the digits already appearing on the screen until the latter digits are erased. As pointed out above, the erase pulse generator 34 provides an erase pulse which is applied to the storage grid 36. At this time, the disconnect switch is in the off position as a result of the stop pulse from counter 32. The erase pulse generator 34, in addition to supplying the erase pulse to grid 36, also supplies a delayed reset pulse to the counter which in turn resets the disconnect switch 37. Thus the disconnect switch is pulsed to the "on" position after the erasure has been completed and the system will then continue its normal operation. If it is desired to retain the displayed information, the erase circuit may be manually turned off by opening switch 30. Thus, the erase pulse generator 34 will not apply an erase pulse to the storage grid nor a second pulse to the disconnect switch which will therefore remain in the off position.

In FIG. 5 there is shown the wiring and connections of the counter 32, disconnect switch 37 and erase pulse generator 34. Counter 32 as shown in FIG. 5 represents the last stage of a multistage counting chain designed to divide by the appropriate number to yield a pulse. This last counting stage comprises two tubes 100 and 101 connected as a multivibrator and set to generate a negative pulse after receiving a number of pulses equal to the number of digits to fill the face of the tube 18. Line 42 passes this negative pulse to the grid of tube 102 of the disconnect switch 37. Tube 102 will thereupon start to extinguish and tube 103 will commence to conduct in the usual multivibrator action. The plate of tube 103 will drop in potential as the tube conducts. Rectifiers 104 and 105 are provided and serve to clamp the plate of tube 103 between two levels. It is recalled from the description of FIG. 1 that the disconnect switch operates to bias the selector amplifier and reference pulse generator below cutoff. This is accomplished by a tube 106 connected as a cathode follower with its grid connected to the plate of tube 103 through line 107 and the cathode connected to the selector amplifier and reference pulse generator. The drop in plate potential of tube 103 is passed to the grid of tube 106 which through the cathode following action thereof controls the selector amplifier 21 and reference pulse generator 22. Also, the positive going plate of tube 102 is connected to the format generators for the resetting thereof when the screen is filled.

The erase circuit 34 comprises a pair of tubes 108, 109 connected as a one-shot multivibrator. The input of the erase circuit is connected by wire 35 to the positive going plate of tube 100 of the counter. The positive pulse thus applied to the grid of tube 108 will cause conduction thereof to lower the potential of its plate which is connected to the collector grid 36. In this manner the digits appearing on the cathode ray tube face are erased and the tube will be prepared to receive further signals. The differentiating circuit on the grid of tube 101 is connected to the plate of tube 109. At the conclusion of the erase pulse the plate of tube 109 will drop in potential to reset the counter 32 over wire 110. The counter will in turn reset the disconnect switch over wires 35 and 111. The erase circuit may be disabled by opening switch 112 when it is desired to retain the digital display on the cathode ray screen.

*Decimal component display.*—The above described embodiment of the present invention is restricted to a single digit display per sampling point of the input function. Another embodiment, now to be described, provides for a more accurate representation of the input function. This embodiment contemplates breaking the input signal at a sampling point into its decimal components and visually representing the components on the screen of the cathode ray tube. For purposes of illustration, let it be assumed that the value of an input signal at a sampling point is 287 volts. This value may be broken up into hundreds, tens and units which may be formed in sequence on the screen and stored for visual observation. This system will be described by reference to FIG. 6 where numeral 50 represents a sensing device which samples the function under consideration. This device may be similar to sensing device 19 of FIG. 1. In the example chosen, the 287 volt magnitude of the function at a particular sampling point is fed by line 51 to step integrator 52. The step integrator may be an Anodige Analogue-to-Digital Converter of the type shown in U.S. National Bureau of Standards Report 1117, or U.S. Patent 2,761,968. Since the details of the latter form no part of the present invention, it is not necessary to consider the specific circuitry thereof. For the purposes of the present invention it is sufficient to state that this converter incorporates an integrator with a staircase voltage output. This output is nulled with the unknown voltage input and the staircase voltage ascent is interrupted one step above the electronic stop point. For a detailed description of the converter, reference may be had to the above cited report. Converter 52 is designed to yield 100 volts per step and with 287 volts applied thereto it will count up three steps and stop. The output is fed by line 53 to an appropriate voltage divider 54 and then to the horizontal selection plates such as plates 14 shown in FIG. 1. Since this output is of a potential determined by the three steps, the electron beam from the write gun 11 will pass through the third character (2) of the matrix 12. Thus the numeral 2 will appear on the screen 13. In addition, one step or 100 volts will be subtracted by intermediate subtractor 55 from the 300 volts converter output and the difference of 200 volts will be passed to the subtractor circuit 56. Also, the 287 volt potential from the sensing device 50 is fed by line 57 to the subtractor circuit which functions to compare these two voltages and feed the difference of 87 volts to a second converter 58 over line 59. Converter 58 is constructed similarly to converter 52 and includes a step integrator set at 10 volts per step. With an input of 87 volts, the step integrator of converter 58 will count up to nine steps and stop. The output of converter 58 is fed by line 61 to a voltage divider 62 to bring the voltage to the proper level depending upon the characteristics of the cathode ray tube. This voltage is then passed through a delay circuit 63 and then to the selection plates 14 of the tube. Since this voltage is determined by the nine steps of converter 58, the electron beam will pass through the ninth character on the matrix and numeral 8 will appear on the screen. The delay circuit 63 is adjusted to delay the tens digit a period of time equal to two reference pulses from the reference pulse generator 22 of FIG. 1 to allow one digit spacing between the hundreds digit 2 and the tens digit 8. As in the case of the hundreds digit, one step will be subtracted from the output of converter 58 by the intermediate subtractor 64 and 80 volts will be passed to subtractor circuit 65 which also receives the 87 volt output from subtractor 56 over lines 59 and 66. Subtractor 65 will compare these two voltages and the 7 volt difference will be passed to a third Analogue-to-Digital Converter 66 over line 67. Converter 66 is of the same type as converters 52 and 58 but set at one volt per step. Thus the step integrator of this converter will generate eight steps and stop. The output of converter 66 as determined by the eight steps of the integrator is passed by line 68 through a proper delay circuit 69 to the selector plates of the cathode ray tube. This will result in the electron beam passing through the eighth character of the matrix and number 7 will therefore appear on the tube screen. Delay circuit 69 is similar to delay circuit 63 so that the three digits 287 will appear in sequence.

The subtractor 56 is shown in detail in FIG. 7 and comprises three amplifier stages. Tube 71 is connected as a unity gain amplifier and serves to invert the positive voltage from the intermediate subtractor 55. In the example chosen, 200 volts will be applied to the grid of tube 71 and will appear as a negative potential at junction point 72. This is combined with the positive signal from the sensing device 50, i.e., 287 volts. The result of the addition of these voltages is one-third the difference of the two quantities. In order to bring the difference potential up to the proper value, two additional stages of amplification are employed. Junction point 72 is connected to the grid of tube 73 the output of which is fed to the input of tube 74. The output of the last tube is passed to the next subtraction stage as shown in FIG. 6.

It is recalled that the step converter 52 overshoots one step and hence this extra step must be substracted from the converter output before it is passed to the subtractor 56. With 287 volts applied to the converter, it will step three times to 300 volts. Since 200 volts must be fed to the subtractor 56 in the example, the intermediate subtractor is interposed in the circuit and functions to subtract 100 volts from the input supplied thereto. FIG. 8 shows the circuit arrangement of the intermediate subtractor 55 which comprises two amplifying tubes 75 and 76. This unit 55 is similar to subtractor 56 but uses a fixed negative voltage source 77 on the negative input terminal. Since there is no need to invert the signal from the converter 52, the unity gain amplifier is omitted. The signal from the converter and the fixed source are both passed through suitable resistors to junction point 78 which in turn is connected to the grid of the first amplifying stage. The ontput of tube 75 connects to the input of tube 76 the output of which is fed to the subtractor 56.

*Simultaneous display of digits and wave form.*—If the input signal is periodic, the system of FIG. 1 may be modified to provide the usual cathode-ray wave form display superimposed over the digital display. FIG. 9 is a block diagram of an arrangement whereby both of these displays are obtained. In this modification the output of the sensing device 19 is connected to the selection amplifier 21 through a conventional electronic switching circuit 81 and to the vertical selection plates 15 through another switching circuit 82. The reference pulse generator 22 supplies pulses to the horizontal format generator and frequency divider through electronic switching circuit 83. Pulse generator 22 also connects through a push button 84 and an appropriate voltage divider 85 to a bistable multivibrator 86. The latter is of conventional construction comprising the usual two tubes that alternately conduct at a constant rate. The plate of one tube connects to switching circuits 81, 83 over line 87 and the plate of the other tube connects to "and" gates 82 and 88 over line 89. It is understood that the multivibrator has a first and second stable condition that control the four "and" gates 81, 83, 82 and 88. In the first stable condition switches 81 and 83 are closed and switches 82 and 88 are open. Thus the signal from the sensing device 19 connects to the amplifier 21 and the reference pulse generator 22 connects to the horizontal format generator and frequency divider. The circuit then functions just as described in regard to FIG. 1 and the digital display is formed on the tube screen. When the screen is filled, i.e., after 64 characters, the multivibrator 86 will flip-flop to the second stable condition as a result of receiving a pulse from generator 22. In this second condition, electronic switches 81, 83 open their respective circuits and switches 82, 88 close. Thus the output signal from sensing device 19 is disconnected from the selection amplifier 21 and applied to the vertical selection plates 15. Also, a horizontal sweep circuit 92 applies a sweep signal to the horizontal selection plates 14. Thus the network is connected to display the wave form of the applied signal which will be superimposed over the digital display on the tube face. A centering selection amplifier 91 is provided to apply centering voltages to the horizontal and vertical section plates during conventional cathode ray display time and is biased off during digital display time.

*Multiplex operation.*—A further modification of the present invention contemplates a simultaneous display of a plurality of varying functions by utilization of a time sharing basis. Each of the input signals is restricted to a particular line of characters on the viewing screen. FIG. 10 shows an arrangement for the simultaneous display of two input functions though it should be understood that any convenient number of functions may be similarly displayed. In this modified system, the two varying functions are applied individually to the sensing devices 114 and 115 which are identical with the single sensing device 19 of FIG. 1. Devices 114 and 115 are connected to the selector amplifier through switching circuits 116 and 117 respectively. These switching circuits may be of any conventional construction and have an open and closed position controlled by flip-flop 118. One condition of the multivibrator closes switch 116 and opens switch 117 and the other condition results in the opening of switch 116 and closing of switch 117. It is seen therefore that the periodic flip-flop of the multivibrator alternately connects the output of the sensing devices to the selector amplifier and hence to the horizontal selector plates. In this manner to varying functions are sampled and digits representative thereof are selected as described above in regard to FIG. 1.

Figure 11:
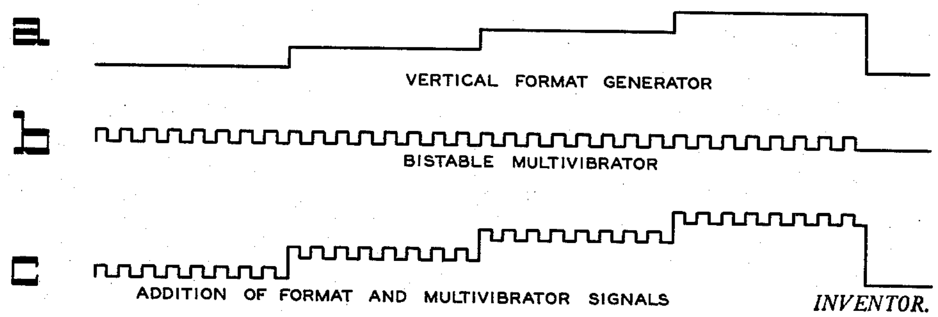

In order for the observer to distinguish between the digits of the two sample functions, it is necessary to properly position the digits on the tube face so that they appear on alternate lines thereon. To accomplish this the horizontal and vertical positioning circuits of FIG. 1 are modified as shown in FIG. 10. The reference pulse generator 22, which in the example chosen may emit 16 pulses in a given period, connects directly to the horizontal format generator 23. Thus the horizontal positioning plates will receive 16 pulses to step the horizontal positioning of selected digits across the face of the tube from left to right. The vertical positioning plates are controlled by two sets of pulses. One set comprises a square wave from a bistable multivibrator 119 connected to amplifier 121. This multivibrator will have two stable conditions alternating from one to the other with each pulse from generator 22. The square wave shown in FIG. 11b results in two potential levels on the vertical positioning plates. The first square wave pulse will cause the position plates to assume the higher level and a character representative of one of the functions will be displayed on this level. As seen in FIG. 12, numeral 1 will appear on the tube screen. The next square wave pulse will cause the position plates to assume the lower of the two levels and the second character (2 in FIG. 12) will be written on the next line. It is understood that at the time tthe second character is sampled, flip-flop 118 will have changed state to reverse the condition of "and" gates 116, 117 so that the second character is sampled from the opposite function than the first. Thus the two functions are alternately sampled with the digital representation of one appearing on the first line of the screen and the digital representation of the other appearing on the second line. The vertical format generator 27 is pulsed from signals passing through the frequency divider 25 and the output thereof is connected to amplifier 121 by means of cathode follower 122. The vertical format generator output is seen in FIG. 11(*a*) and is added to the square wave, FIG. 11(*b*), from the multivibrator 119 resulting in the wave, FIG. 11(*c*), being applied to the vertical position plates. It is realized then that after 16 square wave pulses, the vertical format generator steps and the following characters appear on the third and fourth lines of the tube screen. At this time, a pulse from divider 25 is fed to the horizontal format generator 23 to reset it and the following character will appear on the left of the appropriate line. When the tube screen is filled after 64 pulses, both the vertical and horizontal format generators are reset. The vertical generator is reset by dividing the pulses from divider 25 by four, by means of frequency divider 123, and feeding the pulse to a one-shot multivibrator 124. The latter will shift its condition and reset vertical format generator 27 to its initial condition. With the vertical and horizontal format generators reset, the circuit is prepared to start a new display of characters beginning again on the first and second lines of the tube screen.

Though the present invention has been described with respect to specific embodiments thereof, it is understood that these are not to be considered as limiting the invention as defined in the appended claims.

What is claimed is:

1. A system for digitally representing a varying function on the screen of a cathode ray tube of the type having an electron beam source and a screen for storing digital representations until erased, a pair of horizontal deflection plates, a character forming matrix and a pair of vertical and horizontal position plates, said system comprising horizontal selection means including means to derive a voltage proportional to the varying function, means to apply said voltage to the horizontal deflection plates, a source of periodic reference pulses, means responsive to said reference pulses to generate periodic write pulses, means to apply said write pulses to said electron beam source to periodically provide an electron beam, said electron beam passing through said matrix to form a character depending upon the instantaneous voltage applied to the horizontal deflection plates, a vertical format generator connected to the vertical position plates, a horizontal format generator connected to the horizontal position plates, means connecting the source of reference pulses to the vertical and horizontal format generators whereby successive characters appear in lines and rows on the cathode ray tube screen, means to periodically erase the characters formed on said screen, said erase means comprising an electronic counter, means to connect said write pulse generator to said counter, an erase pulse generator disconnect switching means, said electronic counter being operable to produce an output pulse after a predetermined number of write pulses, means to connect said counter output to the erase pulse generator whereby a pulse is periodically generated to erase the characters formed on the screen, means to connect said counter output to the disconnect switch, means responsive to a counter pulse whereby said disconnect switch renders said vertical format generator, horizontal format generator and horizontal selection means inoperative during character erasing, and means responsive to said erase pulse generator to reset said disconnect switch after said visual characters are erased.

2. A system of the character described comprising a cathode ray tube having an electron beam source, a pair of horizontal and vertical deflection plates, a viewing screen and a character forming matrix, a sensing device operable to derive a voltage proportional to a varying function, means including first switching means to apply said voltage to the horizontal deflection plates, pulse generator means, means including second switching means connecting the generator means to the electron beam source whereby digital characters representative of the varying function are periodically formed on the screen, means including third switching means to apply said voltage to the vertical deflection plates, sweep circuit means, means including fourth switching means connecting the sweep circuit means to the horizontal deflection plates, control means to periodically actuate said first, second, third and fourth switching means, means connecting the pulse generator means to the control means whereby the control means is periodically actuated to close said first and second switching means to permit digital representation of the varying function on said screen and to open said first and second switching means and close said third and fourth switching means to permit wave form representation of the function on the screen.

3. A system for digitally representing a first and second varying function on the screen of a cathode ray tube of the type having an electron beam source, a pair of selector plates and a character forming matrix, a pair of beam positioning plates and an associated source of staircase voltages for positioning a selected character on said screen said system comprising a first sensing means to derive a first voltage proportional to the first varying function, means including first switching means to apply said first voltage to the selector plates, a second sensing means to derive a second voltage proportional to the second varying function, means including second switching means to apply said second voltage to the selector plates, control means connected to alternately open and close said first and second switching means to cause said beam positioning plates to control the display of digital representations of said first and second varying functions alternately on the cathode ray tube screen.

4. A system for digitally representing a first and second varying function on the screen of a cathode ray tube of the type having an electron beam source, a pair of horizontal selector plates, a character forming matrix and a pair of horizontal and vertical positioning plates, said system comprising a first sensing means to derive a first voltage proportional to the first varying function, means including first switching means to apply said first voltage to the horizontal selector plates, a second sensing means to derive a second voltage proportional to the second varying function, means including second switching means to apply said second voltage to the horizontal selector plates, control means connected to alternately open and close said first and second switching means, pulse generator means connected to said control means to provide periodic operation thereof, horizontal position generator means connected to the horizontal positioning plates to determine the horizontal position of the characters on the cathode ray tube screen, means connecting the pulse generator means to the horizontal position generator means, vertical position generator means to provide a staircase signal, means connecting said vertical position generator means to the vertical position plates, multivibrator means operable to provide periodic pulses, means connecting said multivibrator means to the vertical position plates, means connecting said pulse generator means to the vertical position generator means and to the multivibrator means whereby said first and second switching means and multivibrator means are synchronized to position the digital representation of the first and second functions on alternate lines of said screen.

5. A system for displaying visual characters representing a variable function and for simultaneously displaying a graph of said function, comprising a cathode ray tube having a pair of horizontal and vertical beam deflection means, a viewing screen and a character forming matrix for the beam, sensing means to derive sampling voltages proportional to equally successive sampled sections of said function, means to apply said sampled voltages to one of said beam deflection means to select a corresponding character in the matrix as determined by the intercept between the beam and the matrix, time base pulse generating means, another pair of horizontal and vertical beam deflection means, a source of staircase deflection voltages for said other pair of deflection means to position the selected characters successively on said screen, said pulse generating means being connected to render simultaneously effective both said pairs of deflection means to cause each selected character to be displayed on said screen, a sweep circuit for sweeping the beam in a continuous sweep across said screen and arranged to be connected to one deflection means of said other pair of deflection means, and automatic switch means effective in one setting to apply said sampling voltage to one deflection means of the first pair and to apply said staircase deflection voltages to at least one of the second pair of deflection means, to present on said tube visual characters representing said function; said switch means being effective in another setting to disconnect said staircase deflection voltages from its corresponding deflection means and to connect said sweep circuit to one of said deflection means to cause the beam to sweep transversely with respect to the direction of movement caused by the sampling voltage applied to another of said deflection means, thereby to enable said sampled voltage to trace said graph on said screen while said characters are displayed thereon.

(References on following page)

References Cited in the file of this patent

UNITED STATES PATENTS

| | | |
|---|---|---|
| 2,110,746 | Tolson | Mar. 8, 1938 |
| 2,137,888 | Fuller | Nov. 22, 1938 |
| 2,267,827 | Hubbard | Dec. 30, 1941 |
| 2,552,009 | Laws et al. | May 8, 1951 |
| 2,611,811 | Yates | Sept. 23, 1952 |
| 2,728,872 | Smith | Dec. 27, 1955 |
| 2,730,708 | McNaney | Jan. 10, 1956 |
| 2,735,956 | McNaney | Feb. 21, 1956 |
| 2,736,006 | Langevin et al. | Feb. 21, 1956 |
| 2,736,770 | McNaney | Feb. 28, 1956 |
| 2,758,237 | Steinhardt | Aug. 7, 1956 |
| 2,761,968 | Kuder | Sept. 4, 1956 |
| 2,761,988 | McNaney | Sept. 4, 1956 |
| 2,811,665 | McNaney | Oct. 29, 1957 |
| 2,858,475 | Blake | Oct. 28, 1958 |
| 2,889,547 | Wesley | June 2, 1959 |

OTHER REFERENCES

"Aviation Week," Mar. 24, 1952, pp. 35–44 (pp. 36, 43 and 44 relied on).

"Aviation Week," Nov. 15, 1954, pp. 77–86 (pp. 77, 78, 80, 84 and 86 relied on).

"The Type C19K Charactron Tube" by McNaney, copyright 1955 by General Dynamics Corp., presented at National Convention of the I.R.E., Mar. 22, 1955.